United States Patent [19]

Lew et al.

[11] Patent Number: 4,507,034
[45] Date of Patent: Mar. 26, 1985

[54] EXPANDABLE BUSHING AND LOCK FASTENER

[75] Inventors: Wing G. Lew, Los Angeles; Richard A. Deutsch, Tarzana; Mojtaba Nasserian, Northridge, all of Calif.

[73] Assignee: Adjustable Bushing Corporation, North Hollywood, Calif.

[21] Appl. No.: 432,266

[22] Filed: Oct. 1, 1982

[51] Int. Cl.³ .............................................. F16B 39/04
[52] U.S. Cl. ........................................ 411/21; 411/33; 411/348; 24/607
[58] Field of Search ......................... 411/21, 24, 25, 32, 411/33, 348, 386, 190, 197–200; 24/607

[56] References Cited

U.S. PATENT DOCUMENTS

| | | | |
|---|---|---|---|
| 2,573,928 | 11/1951 | Peter | 411/24 |
| 2,734,749 | 2/1956 | Benjamin | 411/33 |
| 3,180,390 | 4/1965 | Ockert, Jr. | 411/348 |
| 3,192,820 | 7/1965 | Pitzer | 411/33 |
| 3,596,554 | 8/1971 | Low et al. | 411/348 |
| 4,285,377 | 8/1981 | Hart | 411/190 |

*Primary Examiner*—Thomas J. Holko
*Assistant Examiner*—Neill Wilson
*Attorney, Agent, or Firm*—Christie, Parker & Hale

[57] ABSTRACT

A pin mounts a plurality of expandable and contractable bushings that upon expansion engage the bore of workpieces to hold the latter together. A ball lock expands behind the workpieces to present a positive lock against axial pullout of the fastener. The bushings are alternate male and female, split ring bushings that have complementary contiguous surfaces that act as wedges. Upon axial compressive loading the female bushings expand and the male bushings contract. The ball lock includes a pair of diametrically opposed balls radially displaceable in the pin. A slide has an annular recess for receiving the balls in a withdrawn position within the pin. A spring normally biases a land of the slide into a position radially inside the balls to rigidly hold the balls in their extended position.

10 Claims, 1 Drawing Figure

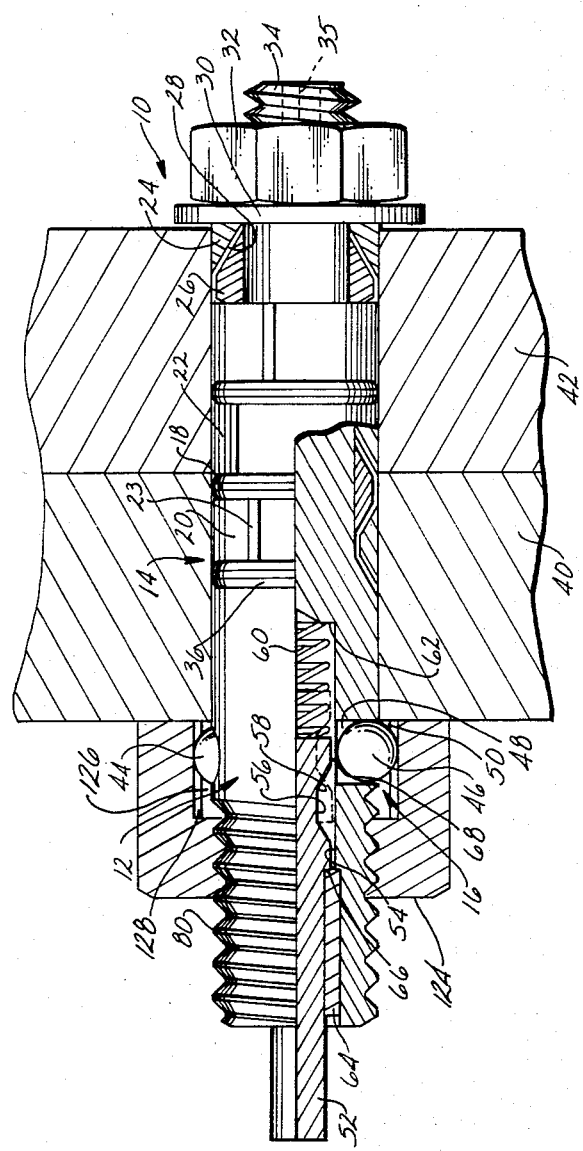

EXPANDABLE BUSHING AND LOCK FASTENER

BACKGROUND OF THE INVENTION

The present invention relates to fasteners in general and, more particularly, to fasteners that employ expandable elements to engage the walls of the structure in which the fastener is used and a positive lock that keeps the fastener from pulling through the structure.

U.S. Pat. No. 3,192,820 to Pitzer describes a quick release pin that employs a plurality of alternate male and female, split ring bushings which cooperate to engage the bores of workpieces to hold the workpieces together. In greater particular, the pin has a head and means such as a cam to apply a tensile force on a core shaft on which the bushings mount and a balancing compressive force on the bushings. The male bushings have conical surfaces facing outward away from the axis of the core shaft. The female bushings have conical surfaces facing inward, towards the axis of the core shaft. Male and female bushings are placed alternately so that the male bushings upon the application of the compression force wedge against the female bushings and expand them tightly against the wall of the structure being fastened. Simultaneously, the female bushings press the male bushings into tight engagement with the core shaft. There are variants of this quick release pin, but all of them use the split ring bushings to effect a radial compressive lock between the fastener and the structure being fastened.

Examples of the variants include blind bolts that employ a nut on a threaded end of the core shaft to effect the compression of the bushings and the expansion of the female bushings against the walls of structure. Means such as a wrenching socket in the core shaft can be used to constrain rotation of that shaft while torque is applied to the nut. Headed bolts may be used in place of the blind bolt where blind applications are not necessary. In this configuration, a standard headed bolt serves for wrenching on one side of the structure and a nut threaded on the other end of the bolt functions to compress the bushings and expand the female bushings into their locking relationship with the structure. Clamp-up bolts are another variant. They employ a core shaft and two threaded ends to permit, first, an expansion of the female bushings into engagement with the structure and, second, a clamp-up of the workpieces of the structure.

U.S. Pat. No. 3,192,820 also describes a positive locking ring for a fastener that expands over a male element in response to the application of an axial compressive force. The ring is located to expand for bearing on the structure outside the hole that receives the fastener to provide a positive interference lock between the fastener and the structure that prevents the fastener from being pulled from the structure towards the side opposite the ring.

The advantages of the split ring bushing fastener are many. They are simple to use and have high shear strength, the equivalent of solid shank bolts of the same diameter. They effect positive alignment between holes in two workpieces. They can provide clamp-up of attached parts. They are easy to install and remove, especially with a cam handle. They are very resistant to vibration. They adapt to blind operation and effect reasonable tensile strength. As a result, they remove or reduce fretting or wear due to vibration or movement. They provide an interference fit with the resultant desirable wall preload and its attendant improved fatigue resistance.

These expandable fasteners find many applications. For example, they may be used on auxiliary fuel tanks for aircraft where, through the mere flipping of a lever, the tanks can be released. They find application in helicopter blades and in mounting military ordnance. In all of these applications it is very important that the fastener secure its load so that it does not fall off, and in all of these applications, load can be subject to severe vibration induced accelerations.

It is desirable, however, to provide the expandable bushing fastener with a positive lock to assure that the fastener does not draw out of the structure fastened. Such a positive lock is effected by an adequate interference between the fastener and the structure in the direction against which axial pullout resistance is desired, typically on the side opposite the active element used to expand the female bushings. Such a positive lock should be free from the effects of vibrations, something to which threaded parts are quite often subject. The lock should be positive in the sense that it is not lost by radial forces on the lock. Thus, springs in the force train should not be used.

SUMMARY OF THE INVENTION

The present invention provides in a fastener of the type that employs expandable bushings and a positive, extendable element lock that presents a positive interference against the fastener pulling out of the structure with which it is used.

In one form the present invention contemplates a fastener with pin on which is mounted at least one radially expandable female bushing, and preferably more. Means are provided to expand the bushing upon the application of axial load on the means, such as male bushings on the pin that have externally tapered camming surfaces contiguous with complementary internally tapered camming surfaces of the female bushings to effect expansion of the latter and contraction of the former upon the application of the axial load. Actuator means on the pin effect the compressive load; such means may include a standard nut threaded onto one end of the pin and a reaction shoulder of the pin on the far side of the bushings relative to the nut. An extendable lock is provided that includes at least one extendable element in the pin that is capable of moving radially between an extended position and a withdrawn position. In the extended position the extendable element can positively engage the surface of the workpiece bounding the bore receiving the fastener and prevent pull-through of the fastener towards the opposite side. The lock also includes means to selectively and rigidly maintain the extendable element in its extended position independently of the expansion means. This means upon displacement permits the withdrawal of the extendable element into its withdrawn position when the fastener is pulled through the bores toward the side opposite the extendable lock.

Preferably, the extendable lock includes at least one ball radially displaceable in the fastener from a withdrawn position no greater than about the diameter of the bushings to an expanded position of major diameter suitable for effecting an interference against axial withdrawal of the fastener from the holes in the structure by engaging the back side of the structure. A plunger or slide positively and rigidly locates the balls in their extended position. Means, preferably a coil spring, urge the slide into this locating position.

The slide preferably has means for accepting the balls in their withdrawn position, such as a ramped, annular groove. The balls may be located in the pin by any number of convenient means such as a swage keeper. Means may be provided to prevent the slide from leaving the pin, such as stakes or a sleeve attached to the pin and engageable with a shoulder of the slide to prevent slide withdrawal.

In one form the present invention provides in its extendable lock means to positively capture a nut and prevent the nut from unthreading without first unlocking the extendable lock. Such means may be in the form of axial grooves around the inside axial surface of a bore in one end of the nut into which balls of the extendable lock are extended.

These and other features, aspects and advantages of the present invention can become more apparent from the following description, appended claims and drawings.

DESCRIPTION OF THE DRAWINGS

For a more complete understanding of the invention, reference should be made to the accompanying drawing, wherein:

The single FIGURE is a side elevational view, partly in half section and partly broken away, of a preferred form of the fastener of the present invention.

DETAILED DESCRIPTION OF THE PREFERRED EMBODIMENTS

Referring to the drawing in detail, the numeral 10 indicates a fastener which includes a core shaft of pin 12, a plurality of axially aligned, split ring bushings 14 and ball lock fastener assembly 16.

The bushings are constituted of alternate male and female bushings. Thus a male bushing 18 is interposed between two female bushings 20 and 22. The bushings are also split along an axial line, as can be seen at 23 for bushing 20. As can be seen on the right in FIG. 1, a one-half female bushing 24 and a male bushing 26 have contiguous facing surfaces 28, the female surface being internal and the male being external. Another way of defining these surfaces is that the male surfaces face radially away from the axis of the fastener and the female faces radially inward towards the axis. These surfaces are camming surfaces, are at an acute angle to the axis of the fastener, and are frusto-conical. The female bushing, when forced along the contiguous surface of the male bushing, expands and produces a complementary contraction in the male bushing.

A thrust washer 30 and a nut 32 threaded onto threads 34 at the end of core shaft 12 effect the expansion of the female bushings. A hexagonal in cross section wrenching recess 35 accepts a wrenching tool to prevent rotation of pin 35. Tightening nut 32 on threads 34 forces thrust washer 30 axially against bushing 24. This forces the bushing up the contiguous surface of male bushing 26. The male bushing is constrained from movement by the stack of bushings, both male and female, on the pin. The final bushing in the stack, bushing 20, is axially restrained by a frusto-conical shoulder 36 of the pin.

This type of bushing array is generally described in U.S. Pat. No. 3,192,820 to Pitzer.

The expandable bushing system just described produces a series of advantages. These bushings permit complete hole fill and interference fit with the structure. In FIG. 1 the structure is shown as two sheets 40 and 42. Thus there is no slop in the resulting joint and there is a virtual elimination of fretting or wear due to vibration. Furthermore, this type of fastener system effects near perfect hole alignment in the workpieces and readily adapts to blind fastening. It also adapts to quick release fastening, as by a cam. The fasteners are easy to install and have excellent shear strength.

In some applications, however, it is highly desirable to provide positive vibration resistant lock against fastener withdrawal from the workpieces, and not to rely solely on the radial compressive engagement of the bushings against the walls of the workpieces. In accordance with the present invention, such a facility exists. Ball lock assembly 16 effects a positive lock against fastener withdrawal from the sheets. At the same time the ball lock assembly is readily released so that the fastener can be removed from the workpieces when desired. Ball lock assembly 16 includes balls 44 and 46. These balls are capable of movement radially of the axis of the pin to an extended position, such as shown and to a retracted position where the balls do not extend radially beyond the adjacent outer radial surface of the pin. Ball 46 is housed in a radial passage 48 which is swaged at 50 to provide a keeper for the ball and prevent the ball from leaving the fastener. A slide 52 within a bore 54 of the pin is capable of axial translation along the axis of the pin. A ramped recess or groove 56 on the slide provides a space for the ball in its withdrawn position, as can be seen by the phantom depiction in FIG. 1. Recess 56 is preferably annular and provides the recess for ball 44 as well as ball 46. The recess has ramped walls 58 so that the balls are forced radially outward upon axial movement of the slide away from the workpieces. A compression spring 60 acts on an interior end of the slide and on a shoulder 62 at the end of bore 54 to bias the slide in a direction effecting extension of the balls. A keeper 64 in the form of a staking sleeve provides a stop for the slide by engaging a shoulder 66 of the slide in the ball extended position.

In the ball extended position the slide presents to the ball an annular land 68 that extends substantially purely axially and has no radial component. Thus the balls cannot be forced into their withdrawn position by radial pressure on them. Instead, slide 52 must be forced against the resistance to spring 60 towards the workpieces to present the recesses to the balls. The balls, being rounded, with withdraw automatically into the recesses because of the force on them by the workpieces when the fastener is withdrawn from the hole in the workpieces. The land is rigid and unyielding and therefore the balls cannot be forced radially inward.

If desired, the fastener may have a threaded end 80 for the attachment of some object. For example, a capture nut 124 may be provided having a bore 126 which surrounds the balls 44 and 46. The capture nut 124 is provided with a plurality of axially aligned internal grooves 128 in the surface of the bore. A diametrically opposed pair of these grooves are engaged by the balls when the balls are radially extended, thus locking the nut 124 against rotation until the balls are retracted.

The operation of the fasteners of the invention is straightforward. The fastener is set by depressing slide 52 against the force of spring 60 to permit balls 44 and 46 to retract into recess 56 during installation, which is from left to right. Alternatively, the balls can be left extended without sleeve depression for installation from right to left. With the balls proximating the back of workpiece 40, nut 32 is tightened on threads 34 to expand the bushing stack and effect a radial compressive lock against the walls of the bore in workpieces 40 and 42.

The present invention has been described with reference to certain preferred embodiments. The spirit and scope of the appended claims should not, however, necessarily be limited to the foregoing description.

What is claimed is:

1. An improved fastener for use in securing workpieces together, the workpieces having alignable holes for receiving the fastener and an outer surface adjacent one of the holes, the fastener comprising:
   (a) a pin for insertion into the holes in the workpieces;
   (b) at least one radially expandable, split ring bushing on the pin, the bushing having an inner tapered surface facing the axis of the pin;
   (c) at least one radially contractable, split ring bushing on the pin, the radially contractable bushing having a tapered outer surface facing away from the axis of the pin, such surface being contiguous with the tapered surface of the radially expandable bushing;
   (d) means on the pin to maintain the radially contractable split ring bushing at a predetermined axial position on the pin;
   (e) actuator means on one end of the pin for producing an axial compressive force on the radially contractable split ring and a consequent expansion of the radially expandable bushing; and
   (f) a ball lock including at least one ball located proximate the other end of the pin from the actuator means for bearing against the surface that is adjacent the holes, a slide displaceable independently of the actuator means between a first and a second position, the slide having a recess for receiving the ball in a radially withdrawn position in the first position of the slide and a land for maintaining the ball in a radially extended position in the second position of the slide, and biasing means for maintaining the slide in position to maintain the ball extended, the slide being movable against the biasing means to release the ball.

2. The improved fastener claimed in claim 1 wherein the slide is accessible from the one end of the pin opposite from the actuator means for the displacement of the slide.

3. The improved fastener claimed in claim 1 including a nut, threads on the pin for receiving the nut proximate the ball, and the nut having a counterbore with at least one axial groove to receive the ball when extended and lock the nut in place.

4. An improved fastener for use in securing workpieces together, the workpieces having alignable bores and an outer surface through which one end of the bores passes, the fastener comprising:
   (a) a pin for insertion into the bores;
   (b) at least one radially expandable split ring bushing on the pin, the bushing having an interior camming surface at an acute angle to the axis of the pin;
   (c) a male bushing for each of the split ring bushings and located on the pin to bear on the camming surface of its associated split ring and expand the split ring bushing to effect its radial engagement with the wall of the bores in the workpiece upon the application of an axial compressive load on the male bushing;
   (d) actuator means on the pin for producing the compressive load on the male bushing;
   (e) an extendable lock including at least one extendable element in the pin displaceable radially between an extended position and a withdrawn position, the extendable element in the extended position being positioned to positively engage the workpiece on the outer surface and prevent the fastener from pulling through the bores from the side thereof where such engagement takes place and in the withdrawn position being within the pin and out of engagement with outer surface of the workpiece; and,
   (f) means to selectively and rigidly maintain the extendable element in its extended position independently of the actuator means, the such means being displaceable to permit the withdrawal of the extendable element into into its withdrawn position, the extendable element having a surface for engaging the workpiece and being forced into its withdrawn position when the selective maintenance means is not actuated and the fastener is pulled through the bores towards the side thereof opposite that on which the extendable lock is located.

5. The improved fastener claimed in claim 4 wherein the selective maintenance means of the extendable lock comprises a slide movable in a bore and extending into the pin from the opposite end from the actuator means, the slide being movable axially of the pin, the slide having a land for engaging a basal surface of the extendable element to maintain it in the extended position and a recess to receive the element in its withdrawn position, and biasing means acting on the slide to normally maintain it with the land in engagement with the basal surface for the maintenance of the extendable element in its extended position.

6. The improved fastener claimed in claim 5 wherein the slide is accessible from the end of the pin opposite the actuator means for displacing the slide inwardly of the pin against the biasing means to release the extendable lock.

7. The improved fastener claimed in claim 4 wherein the slide is defined by a generally cylindrical plug and the recess comprises an annular groove in the cylindrical outer wall of the plug, the groove having ramped walls for easing the extendable elements exit from the recess.

8. The improved fastener claimed in claim 7 wherein the extendable element comprises a ball.

9. The improved fastener claimed in claim 8 including a plurality of the expandable split ring bushings and the male bushings comprising a plurality of bushings having externally tapered surfaces, the externally tapered bushings being alternately placed with respect to the expandable split ring bushings.

10. The improved fastener claimed in claim 8 including a nut, threads on the pin for receiving the nut proximate the ball, and the nut having a counterbore with at least one axial groove to receive the ball when it is extended and lock the nut in place.

* * * * *